(12) United States Patent
McClure et al.

(10) Patent No.: US 8,718,874 B2
(45) Date of Patent: *May 6, 2014

(54) RASTER-BASED CONTOUR SWATHING FOR GUIDANCE AND VARIABLE-RATE CHEMICAL APPLICATION

(71) Applicants: John A. McClure, Scottsdale, AZ (US);
Dennis M. Collins, Overgaard, AZ (US)

(72) Inventors: John A. McClure, Scottsdale, AZ (US);
Dennis M. Collins, Overgaard, AZ (US)

(73) Assignee: AgJunction, LLC, Hiawatha, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,512

(22) Filed: Feb. 25, 2013

(65) Prior Publication Data

US 2013/0179026 A1 Jul. 11, 2013

Related U.S. Application Data

(63) Continuation of application No. 12/689,184, filed on Jan. 18, 2010, now Pat. No. 8,386,129.

(60) Provisional application No. 61/145,542, filed on Jan. 17, 2009.

(51) Int. Cl.
*A01B 69/00* (2006.01)
*B62D 6/00* (2006.01)

(52) U.S. Cl.
USPC .................................. 701/41; 701/44; 701/50

(58) Field of Classification Search
USPC .................................. 701/41, 44, 50
See application file for complete search history.

(56) References Cited

U.S. PATENT DOCUMENTS

| | | | |
|---|---|---|---|
| 5,430,654 | A | 7/1995 | Kyrtsos et al. |
| 5,631,658 | A | 5/1997 | Gudat et al. |
| 5,646,844 | A | 7/1997 | Gudat et al. |
| 5,684,476 | A | 11/1997 | Anderson |
| 6,073,070 | A | 6/2000 | Diekhans |
| 6,804,587 | B1 | 10/2004 | O Connor et al. |
| 7,623,952 | B2 | 11/2009 | Unruh et al. |
| RE41,358 | E | 5/2010 | Heiniger et al. |
| 8,140,223 | B2 | 3/2012 | Whitehead et al. |
| 8,265,826 | B2 | 9/2012 | Feller et al. |
| 8,437,901 | B2 | 5/2013 | Anderson |
| 2002/0107609 | A1 | 8/2002 | Benneweis |
| 2003/0187560 | A1 | 10/2003 | Keller et al. |
| 2007/0021913 | A1* | 1/2007 | Heiniger et al. ............. 701/213 |
| 2008/0195268 | A1 | 8/2008 | Sapilewski et al. |
| 2009/0099737 | A1* | 4/2009 | Wendte et al. ................. 701/50 |

(Continued)

FOREIGN PATENT DOCUMENTS

| | | |
|---|---|---|
| AU | 2002244539 | 10/2002 |
| AU | 2002325645 | 9/2007 |
| WO | WO-2008080193 | 7/2008 |
| WO | WO-2010005945 | 1/2010 |

*Primary Examiner* — Behrang Badii
*Assistant Examiner* — Daniel L Greene
(74) *Attorney, Agent, or Firm* — Mark E. Brown; Law Office of Mark E. Brown, LLC

(57) ABSTRACT

A raster-based system for global navigation satellite system (GNSS) guidance includes a vehicle-mounted GNSS antenna and receiver. A processor provides guidance and/or autosteering commands based on GNSS-defined pixels forming a grid representing an area to be treated, such as a field. Specific guidance and chemical application methods are provided based on the pixel-defined treatment areas and preprogrammed chemical application prescription maps, which can include variable chemical application rates and dynamic control of the individual nozzles of a sprayer.

1 Claim, 9 Drawing Sheets

(56) References Cited

U.S. PATENT DOCUMENTS

| | | |
|---|---|---|
| 2009/0121932 A1 | 5/2009 | Whitehead et al. |
| 2010/0312428 A1 | 12/2010 | Roberge et al. |
| 2011/0015817 A1 | 1/2011 | Reeve |
| 2011/0018765 A1 | 1/2011 | Whitehead et al. |
| 2011/0054729 A1 | 3/2011 | Whitehead et al. |
| 2011/0270495 A1 | 11/2011 | Knapp |
| 2012/0174445 A1 | 7/2012 | Jones et al. |
| 2013/0179026 A1 | 7/2013 | McClure et al. |

* cited by examiner

RASTER-BASED CONTOUR SWATHING FOR GUIDANCE AND VARIABLE-RATE CHEMICAL APPLICATION

CROSS-REFERENCE TO RELATED APPLICATIONS

This application is a continuation of and claims priority in U.S. patent application Ser. No. 12/689,184, filed Jan. 18, 2010, now U.S. Pat. No. 8,386,129, issued Feb. 26, 2013, which claims priority in U.S. Provisional Patent Application Ser. No. 61/145,542, filed Jan. 17, 2009, both of which are incorporated herein by reference.

BACKGROUND OF THE INVENTION

1. Field of the Invention

The present invention relates generally to automated equipment control using a raster-based database, including vehicle navigation and guidance using global navigation satellite system (GNSS), inertial navigation system (INS) and other positioning inputs, and machine control functions such as variable-rate chemical applications in agricultural spraying.

2. Description of the Related Art

GNSS technology advanced vehicle and machine guidance and control in various technical fields, including the field of agricultural guidance by enabling reliable, accurate systems, which are relatively easy to use. GNSS guidance systems are adapted for displaying directional guidance information to assist operators with manually steering the vehicles. For example, the OUTBACK® steering guidance system, which is available from Hemisphere GPS LLC of Calgary, Alberta, Canada and is covered by U.S. Pat. Nos. 6,539,303 and 6,711,501 (incorporated herein by reference), includes an on-board computer capable of storing various straight-line and curved ("contour") patterns. An advantage of this system is its ability to retain field-specific cultivating, planting, spraying, fertilizing, harvesting and other patterns in memory. This feature enables operators to accurately retrace such patterns. Another advantage relates to the ability to interrupt operations for subsequent resumption by referring to system-generated logs of previously treated areas. The OUTBACK S steering guidance system, and related product offerings from Hemisphere GPS LLC, utilize "near point search method" technology, which logs GPS-defined positions along swath edges, the nearest of which are located for placing the edge of the next swath against the last.

Another type of GPS guidance utilizes "form line following," wherein vectors, which can be straight-line (A-B) or curved (contour), are computed based on equipment widths offset from the previously-driven form lines. A disadvantage with this type of system is that initial form lines must be driven and delineated based upon which subsequent form lines must be computed and followed. Significant computer overhead can be occupied with such tasks, whereby trade-offs are required between component costs and system responsiveness.

GNSS vehicle guidance equipment using the above techniques is available as a steering guide with a graphical user interface (GUI) for manually-steered vehicles, and also with an autosteer function for automatically steering the vehicle along all or part of its travel path. Automated systems can also control an agricultural procedure or operation, such as spraying, planting, tilling, harvesting, etc. Examples of such equipment are shown in U.S. Pat. No. 7,142,956, which is incorporated herein by reference. U.S. Patent Application Publication No. 2004/0186644 shows satellite-based vehicle guidance control in straight and contour modes, and is also incorporated herein by reference. U.S. Pat. No. 7,162,348 is incorporated herein by reference and discloses an articulated equipment position control system and method whereby a working component, such as an implement, can be guided independently of a motive component, such as a tractor. The implement can optionally be equipped with its own GNSS antenna and/or receiver for interacting with a tractor-mounted GNSS system.

Ideally crops would be planted in perfectly straight, evenly-spaced rows. Guidance through such fields would consist of following relatively simple straight-line patterns. Such guidance modes are commonly referred to as straight line or "A-B" in reference to the equipment traveling in a straight line from point A to point B in a repeating pattern in order to cover an entire field, which is typically flat and rectangular and therefore efficiently divided into multiple, parallel swaths. However, field conditions in many areas are not suitable for A-B guidance. For example, hilly terrain sometimes requires the formation of constant-elevation terraces.

Guidance systems accommodate such irregular conditions by operating in "contour following" modes consisting of curvilinear tracks defined by multiple GNSS points along which the equipment is guided. Initial planting passes made with manual and visually-guided navigation, which may or may not be supplemented with GNSS navigational aids, can cause crop rows to deviate from straight lines. Accommodating such irregular crop rows in subsequent operations (e.g., spraying and harvesting) may require the equipment to deviate from straight-line passes.

"Tramline" (sometimes referred to as "match tracks") is another operating mode available with some modern GNSS guidance systems. In tramline operating mode the existing crop rows are relatively well protected because the equipment follows or "matches" the previously-driven passes. The equipment wheels or tracks are thus confined between the crop rows. Machine damage from running over crops is thus avoided, or at least minimized.

Preferably a system embodying an aspect of the present invention would avoid the drawbacks inherent in the previous systems described above and be adaptable to various machine control applications, including variably controlling the output of individual nozzles in agricultural sprayers. In particular, raster (e.g., bitmap) data bases can be used with previously-defined world geodetic systems, such as WGS 84, thereby eliminating overhead-intensive tasks such as continuously running extensive searches for points along the edges of previously-driven swaths or computing form lines.

Heretofore there has not been available a raster-based contour swathing system and method with the advantages and features of the present invention.

SUMMARY OF THE INVENTION

In the practice of the present invention, a system and method are provided for automatically guiding and controlling vehicles and equipment using GNSS for defining a raster-based database of pixels defining either an entire area to be treated, or a subset through which a vehicle travels. For example, agricultural equipment comprising a tractor and an implement can be equipped with a vector position and heading sensor subsystem including a GNSS receiver and antennas and an optional inertial navigational system (INS) with X, Y and Z axis sensors for sensing equipment attitude changes through six degrees of freedom. Such sensors typically comprise gyroscopes and/or accelerometers. A 2D map array comprises an XY grid of pixels, which is scalable according to the requirements of a particular operation. Guidance operations are accomplished by marking pixels as "applied" when treated on an equipment pass. Subsequent passes can guide off of the applied pixel areas, using "target" aim point pixels and/or swath-width spacing to one side or the other of the applied areas. Moreover, machine control functions can actuate certain operations based on equipment position. For example, spray nozzles on a sprayer implement can be selectively and individually actuated over areas to be sprayed.

DETAILED DESCRIPTION OF THE PREFERRED EMBODIMENTS

I. Introduction and Environment

Figure 1:
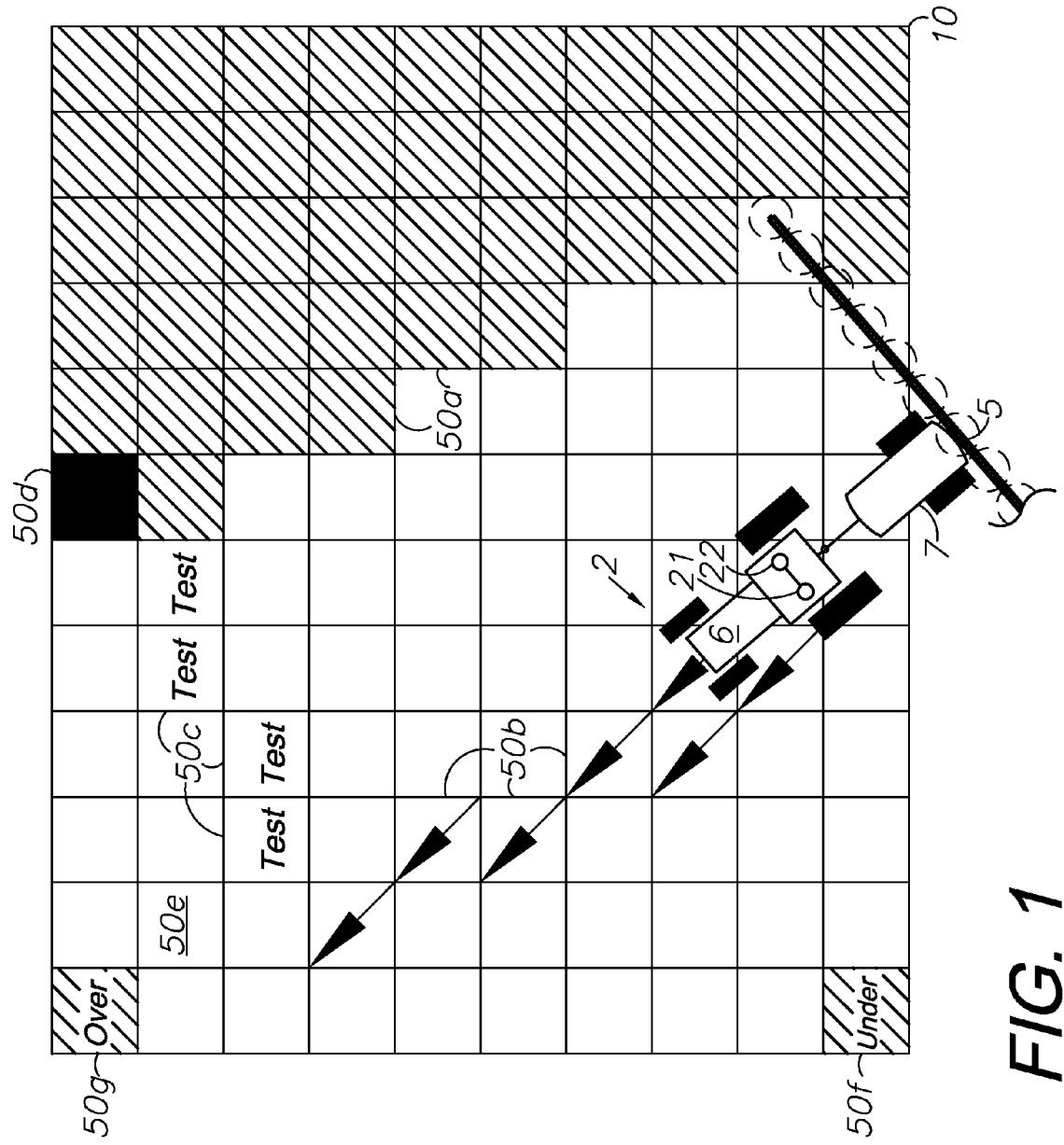
FIG. 1 is a plan view of agricultural equipment equipped with GNSS and (optionally) INS guidance and control systems, shown in operation on a field defined by an XY array of pixels.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof Global navigation satellite systems (GNSS) are broadly defined to include GPS (U.S.), Galileo (proposed), GLONASS (Russia), Beidou (China), Compass (proposed), IRNSS (India, proposed), QZSS (Japan, proposed) and other current and future positioning technology using signals from satellites, using single or multiple antennae, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along transverse X, longitudinal Y and vertical Z axes). Yaw, pitch and roll refer to moving component rotation about the Z, X and Y axes respectively. Said terminology will include the words specifically mentioned, derivatives thereof and words of similar meaning.

II. Guidance and Control System 4

Referring to the drawings in more detail, the reference numeral 2 generally designates a piece of agricultural equipment, which is equipped with a raster-based guidance and control system 4 embodying an aspect of the present invention. Without limitation on the generality of equipment 2, a motive component 6 is connected to a working component 7 through an optional articulated connection or hitch 34 (collectively comprising the equipment or vehicle 2). Also by way of example, the motive component 6 can comprise a tractor or other vehicle and the working component 7 can comprise a ground-working implement. However, the system 4 can be applied to other equipment configurations for a wide range of other applications. Such applications include equipment and components used in road construction, road maintenance, earthworking, mining, transportation, industry, manufacturing, logistics, etc.

FIG. 1 shows the equipment 2 operating on a portion of a field 10 with an array of XY pixels 50, which are used for providing guidance and controlling the operation of the implement 7, which can comprise a sprayer with individual nozzles 8.

Figure 2:
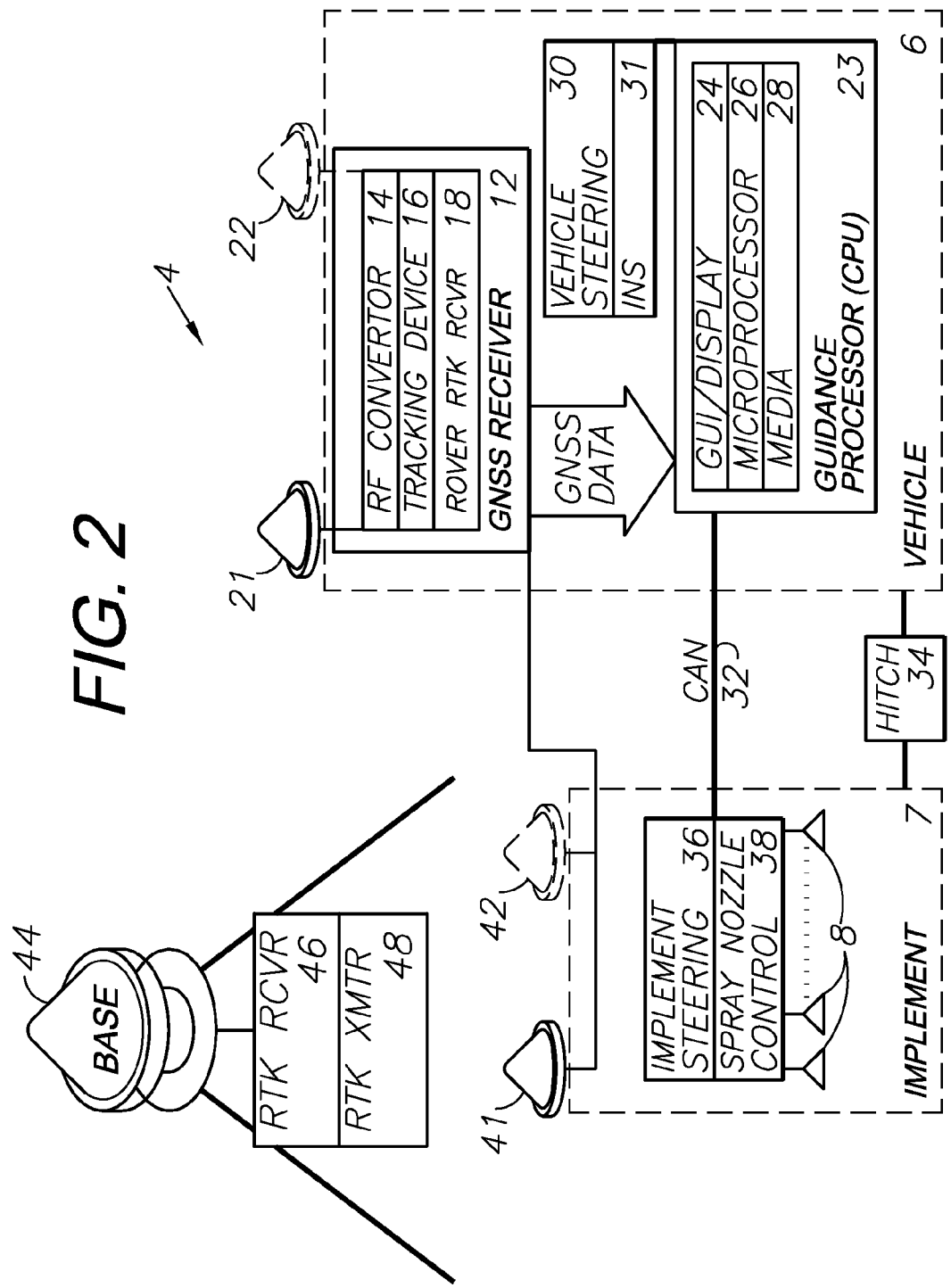
FIG. 2 is a block diagram of a GNSS/INS/RTK tractor and implement system for implementing the raster-based guidance system and method.

FIG. 2 is a schematic block diagram showing the components of the GNSS guidance/control system 4. The tractor 6 components include a GNSS receiver 12 including a first vehicle antenna 21, an optional second vehicle antenna 22, an RF (down) converter 14, a tracking device 16 and an optional rover RTK receiver 18. A guidance processor CPU 23 includes a GUI display 24, a microprocessor 26 and a media storage device 28. Vehicle steering 30 and INS components 31 (e.g., gyroscopes and/or accelerometers) are connected to the guidance processor 23. GNSS-derived data is transferred from the GNSS receiver 12 to the guidance processor CPU 23. The implement 7 can include a first implement antenna 41 and an optional second implement antenna 42, which are connected to the vehicle GNSS receiver 12 and provide GNSS data thereto.

An implement steering subsystem 36 receives steering commands from the guidance processor CPU 23 via a CAN bus 32 or some other suitable connection, which can be wireless. The implement 7 is mechanically connected to the vehicle 6 by a hitch 34, which can be power-driven for active implement positioning in response to implement steering commands, or a conventional mechanical linkage. The hitch 34 can be provided with sensors for determining relative attitudes and orientations between the vehicle 6 and the implement 7. Examples of such an articulated connection and an implement steering system are described in U.S. Pat. Nos. 6,865,465, 7,162,348 and 7,460,942, which are incorporated herein by reference. The implement 8 can comprise any of a wide range of suitable implements, such as planting, cultivating, harvesting and spraying equipment. For example, spraying applications are commonly performed with a boom 5, which can be equipped for automatic, selective control of multiple nozzles 8 and other boom operating characteristics, such as height, material dispensed, etc. By way of example and without limitation, the implement 7 can comprise an agricultural sprayer with a spray nozzle control 38 connected to the guidance processor CPU 23 by the CAN bus 32 for individually controlling the spray nozzles 8.

The GNSS/INS guidance and control system 4 can be configured in various combinations of components and thereby accommodate a wide range of guidance and control operations. For example, RTK guidance can be accommodated with a base 44 including an RTK receiver 46 and an RTK transmitter 48, which can be mounted at a fixed-position reference point in the general vicinity of fields being worked by the equipment 2. Moreover, various combinations of receivers and antennas can be used on the vehicle 6 and/or the implement 7, including single frequency (L1 only) and dual frequency (L1 and L2). Various forms of signal correction can also be utilized, including Satellite Based Augmentation System (SBAS), Wide Area Augmentation System (WAAS) and private subscription services.

Figure 3A:
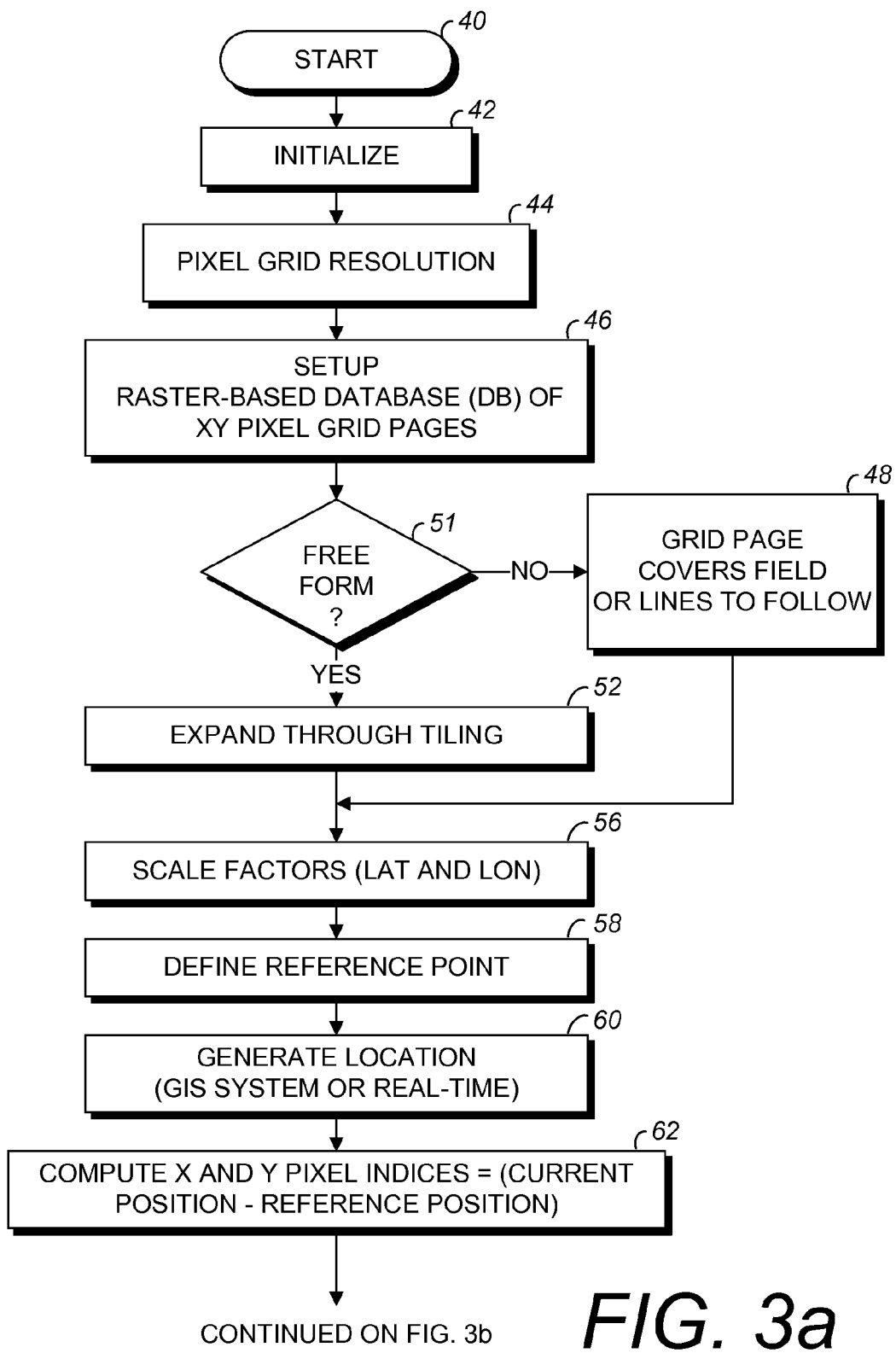
FIGS. 3a and 3b show a flowchart of a raster-based guidance method.
Figure 3B:
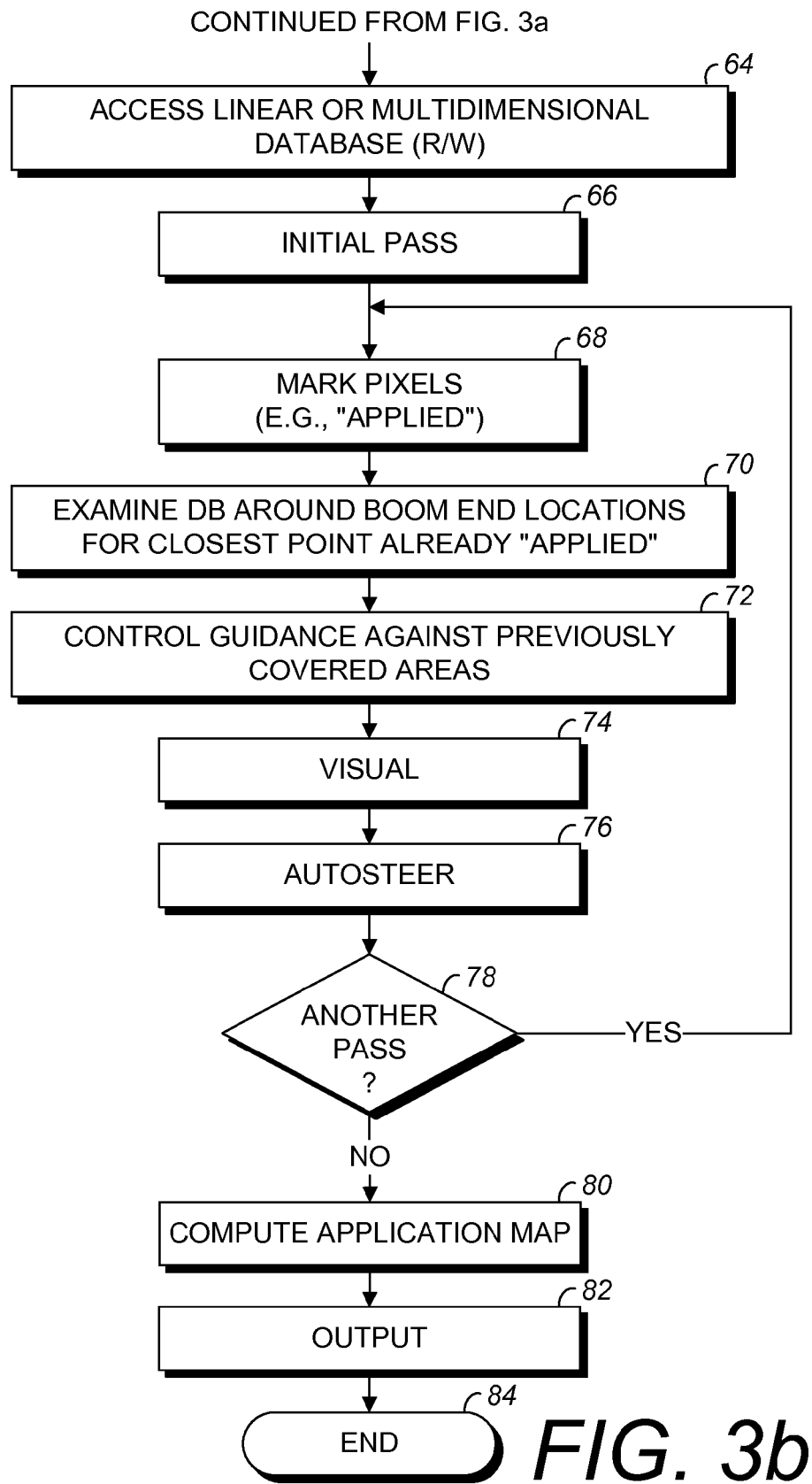

The GNSS receiver 12 disclosed herein can be adapted for various satellite navigational systems, and can utilize a variety of SBAS technologies. Technology is also available for continuing operation through satellite signal interruptions, and can be utilized with the system 4. The antennas 21, 22 can be horizontally aligned transversely with respect to a direction of travel of the tractor 6, i.e. parallel to its transverse X axis. The relative positions of the antennas 21, 22 with respect to each other can thus be processed for determining yaw, i.e. rotation with respect to the vertical Z axis. The INS 31 can include inertial sensors (e.g., gyroscopes and accelerometers) for detecting and measuring inertial movement with respect to the X, Y and Z axes corresponding to yaw, roll and pitch movements in six degrees of freedom. Signals from the receiver 12 and the INS sensors are received and processed by the microprocessor 26 based on how the system 4 is configured and programmed III. Raster-based Guidance and Control Method FIGS. 3a and 3b show a method of raster-based guidance and control according to an aspect of the present invention. From a start 40 the system 4 is initialized at 42, including setting a pixel grid resolution at 44. Without limitation, pixel grid resolution in the approximate range of 0.05 meters to 5 meters can be useful for various operations, depending on the desired accuracy.

Setup of a raster-based database (DB) of XY pixel grid pages 48 occurs at 46. An example of a pixel grid page 48 is shown in FIG. 1 and includes multiple pixels 50. Pixel grid pages can cover entire fields, or, alternatively from decision box 51, can be freeform and automatically expandable in any direction through a tiling method at step 52. An exemplary preferred method is to use a rectangular grid based on WGS 84 comprising GPS-based coordinates for generating a grid page at 48. Scale factors for latitude and longitude are set at 56 and an initial reference point is defined at 58. A location in the grid area can be generated at 60 on a GIS system, such as the MapStar™ program available from Hemisphere GPS of Calgary, Alberta, Canada, or in real-time in the field on the guidance system 4. Locations in the grid area are defined by the number of pixels east-west (EW) and north-south (NS) from the reference location at 62. A linear or multidimensional database is accessed at 64 using the XY pixel indices computed at 62. The database can be accessed and read and/or written to (R/W) at 64.

In an exemplary field spraying operation using the sprayer 7, the equipment 2 is driven in an initial pass at 66 in a "swath" mode with its swath width comprising one of the operating parameters whereby all pixels covered by the spray boom 5 are marked as "applied" (50a in FIG. 1) at step 68. On a subsequent adjacent pass, the database around the spray boom end locations is examined for the closest applied pixel 50a at 70, which is designated 50d (tested and applied) in FIG. 1, and is then used for instantaneous guidance control at 72, either through a visual GUI at 74 and/or an autosteering function at 76.

As shown in FIG. 1, the operator can thereby drive against previously covered (applied) pixels 50a. The database can be programmed for "unapplied" 50e and "applied" 50a pixel status conditions. Other pixel status conditions can include "vehicle track" 50b, "unapplied test" 50c, "applied test" 50d, "unapplied" 50e, "under-applied" 50f and "over-applied" 50g (FIG. 1). The process continues via a loop through the "another pass" decision box 78 until complete or interrupted, whereafter an application map showing database values, pixel status, equipment positions and headings is computed at 80 and output at 82 with the operation ending at 84.

Figure 4:
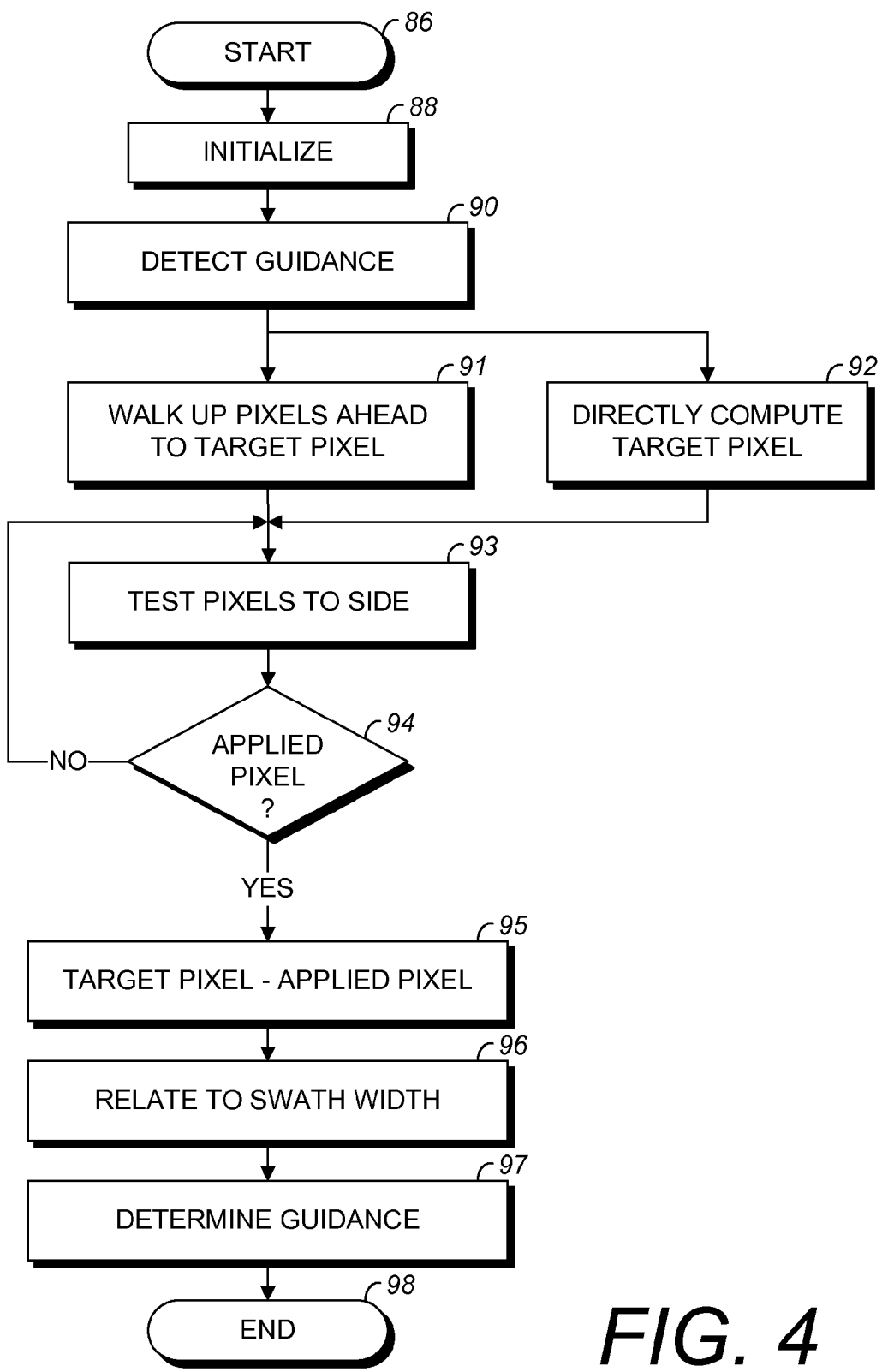
FIG. 4 is a flowchart of another aspect of the raster-based guidance method using target pixels.

FIG. 4 shows another method of guidance using the vehicle 6 location, swath (e.g., spray boom 5) width and direction of travel. From start 86, initialize 88 and detect guidance 90, vehicle track/target pixels 50b (FIG. 1) ahead of the equipment 2 are "walked up" from the center of the vehicle 6 to a point ahead using either a Bresenham-type algorithm at 91 or by directly computing a track/target pixel 50b ahead at 92. Then the unapplied test pixels 50c to the side of the track/target pixel 50b are tested for "applied" status at 93. Upon detecting an applied test pixel 50d at 94, its distance away from the track/target pixel 50b relative to the implement swath width (i.e. "offset" generally equal to half of the swath width) is obtained at 95, related to swath width at 96, used to determine guidance at 97 and the method ends at 98.

Figure 5:
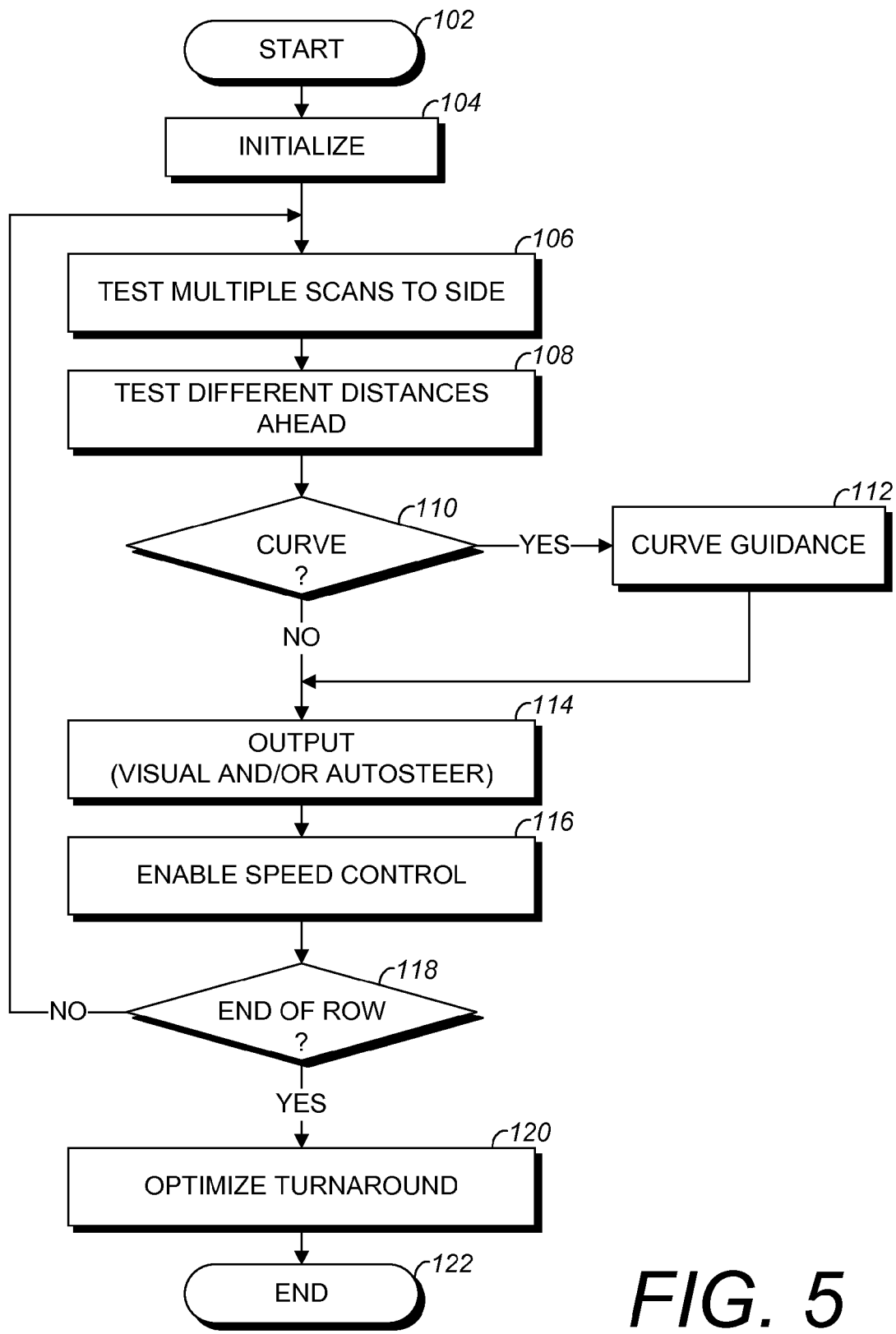
FIG. 5 is a flowchart of another aspect of the raster-based guidance method.

As shown in FIG. 5, a similar method can be used for computing guidance using two dimensions (2D). From start 102 and initialize 104, multiple scans to the side of the vehicle and different distances ahead of it are tested at 106, 108 respectively to detect previously-applied areas along curves at 110 and to implement curve guidance at 112. The output can be provided visually via a GUI 24 and/or used in an autosteering algorithm at 114. Speed control at 116 and end-of-row turnaround at 118, 120 can be enabled and optimized. The method ends at 122.

Figure 6:
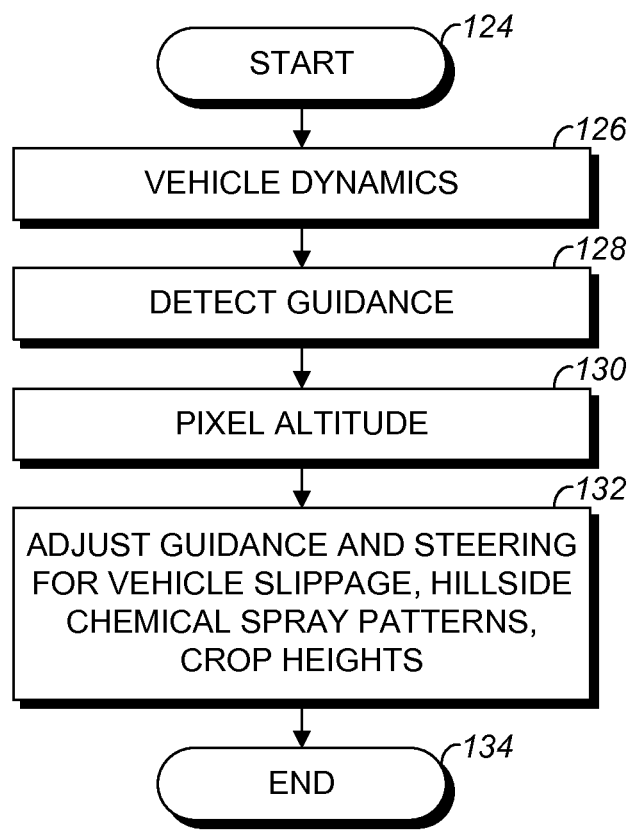
FIG. 6 is a flowchart of another aspect of the raster-based guidance method.

FIG. 6 shows a variation comprising a 3D method using the altitudes of the different pixels for adjusting guidance and steering. From a start 124 vehicle dynamics are input as operating parameters at 126, guidance is detected at 128 and pixel altitudes are input at 130. For example, the method can compensate by remaining closer to the applied area to adjust for vehicle downhill slippage and hillside chemical spray patterns at 132. Such 3D information can also correspond to crop heights with the system making suitable adjustments, also at 132. The method ends at 134.

Figure 7:
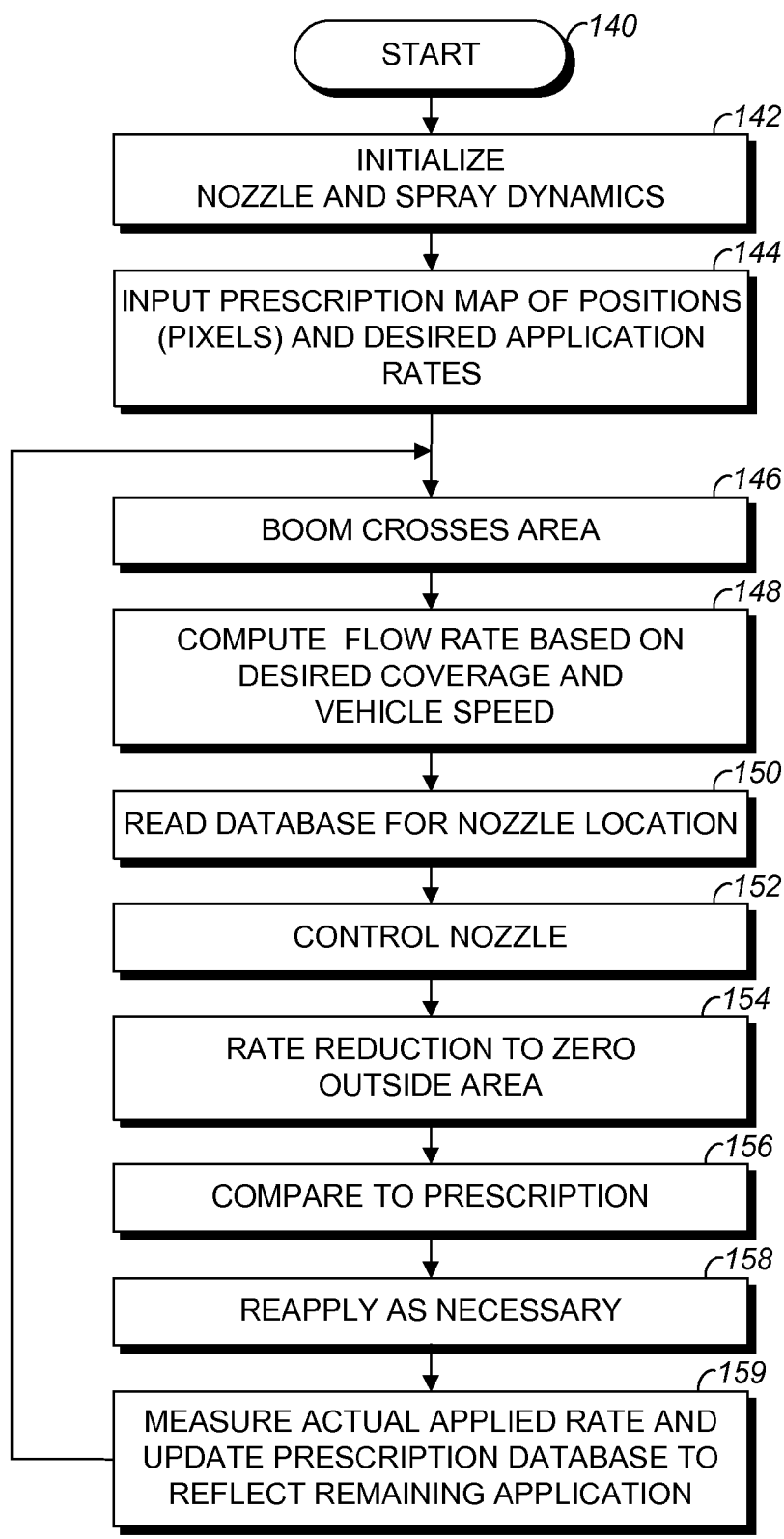
FIG. 7 is a flowchart of another aspect of the raster-based guidance method including spray nozzle control.

FIG. 7 shows another method of the invention involving sprayer nozzle control. From a start 140 the nozzle and spray dynamics are initialized at 142. A chemical spray prescription map including the positions represented by pixels and target chemical application rates (e.g. gallons per acre) is input at 144. Operation commences as the spray boom crosses an area at 146 and flow rate is computed based on desired coverage (i.e. prescription database value) and vehicle speed at 148. The database is read for the locations of the spray nozzles at 150 whereby their pixel-defined locations are used for determining chemical applications and nozzle control at 152. At 154 the dispensing rate for one or more of the nozzles 8 is reduced to zero if the equipment 2 travels outside the predetermined application area, e.g., field 10. A comparison with the prescription occurs at 156 followed by reapplication as necessary at 158 followed by measure actual applied rate and update prescription database to reflect remaining application at 159 followed by a loop back to 146. The process shown in FIG. 7 is continuous in the sense that the operator can start and stop at any time and the sprayer will only dispense when located over a pixel 50 with a non-zero prescription database value. Thus, the field 50 is completely treated when all of its pixels 50 have zero prescription database values, and the system will no longer dispense.

In conjunction with the methods described above, variable rate control can be accomplished using multiple channels for individual nozzle control of chemical applications. For example, the CAN bus 32 communicates individual nozzle control commands from the processor 23 to the spray nozzles 8, which can be monitored and boom pressure controlled thereby for correct calibration. Individual nozzle flow rate control across the entire spray boom accommodates swath overlaps whereby spray nozzle output would be reduced or shut off. Nozzles 8 can also be shut off upon entry into previously-applied areas and no-spray areas, such as outside the field boundaries.

The pixel status in the method of the present invention includes information on the chemical(s) application rates(s). As the spray boom 5 crosses the treatment area the database is read for each nozzle 8 location and the desired rates per area, e.g. gallons per acre. The nozzle flow rate is then adjusted to the required output, e.g., in gallons per minute (GPM) based on the current nozzle speed. The amount of coverage during turning of the vehicle can also vary according to the nozzle locations in the turn, with the outermost nozzle 8 traveling fastest (requiring the greatest flow rate) and the innermost nozzle traveling slowest (requiring the least flow rate). Such speeds can vary considerably in turns and are accommodated by the system 4.

Alternative algorithms can be utilized for managing chemical application. For example, in a "rate reduction to zero" algorithm the application rates can be progressively reduced on one or more passes as required to "zero out" the applied material quantities across the boom widths whereby on subsequent passes the applied rate will be zero gallons per acre. Alternatively, in an "as applied map" algorithm the application rates can be read back in real time from the processor 23 and subtracted from the desired target rate per pixel and written back as the remaining desired rates with a flag indicating partial application marking the partially-treated (under-applied) pixels 50f. The real time database display reflects the remaining rates required for each pixel, the remaining chemical required for the completion of the field area and the remaining quantities available.

Various output information can be provided to an operator, e.g., indicating pixel status originally and currently, "as applied" mapping and remaining chemical application rates by pixel for job completion. By individually controlling the flow rates at the nozzles 8, the desired prescription map area rate can be achieved, thereby optimizing variable rate coverage for increased crop production. Less-experienced operators can be accommodated because the system 4 reduces the likelihood of over-application or application outside the field perimeter.

Figure 8A:
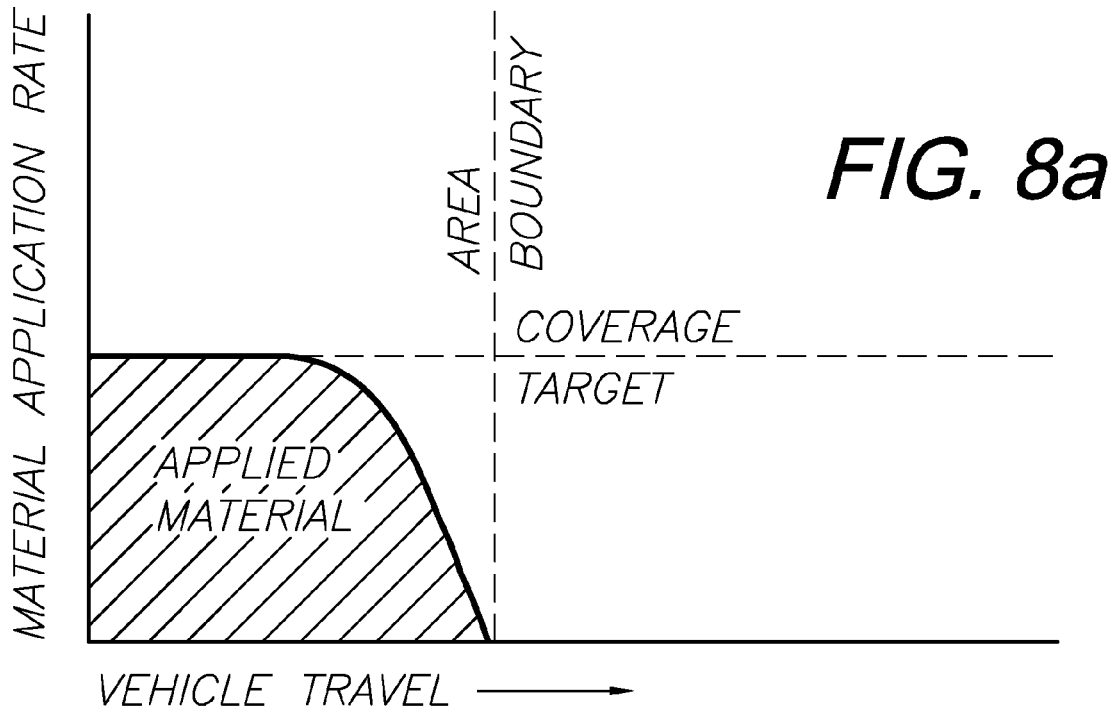
FIG. 8a is a diagram of material application parameters on exiting a treated area.
Figure 8B:
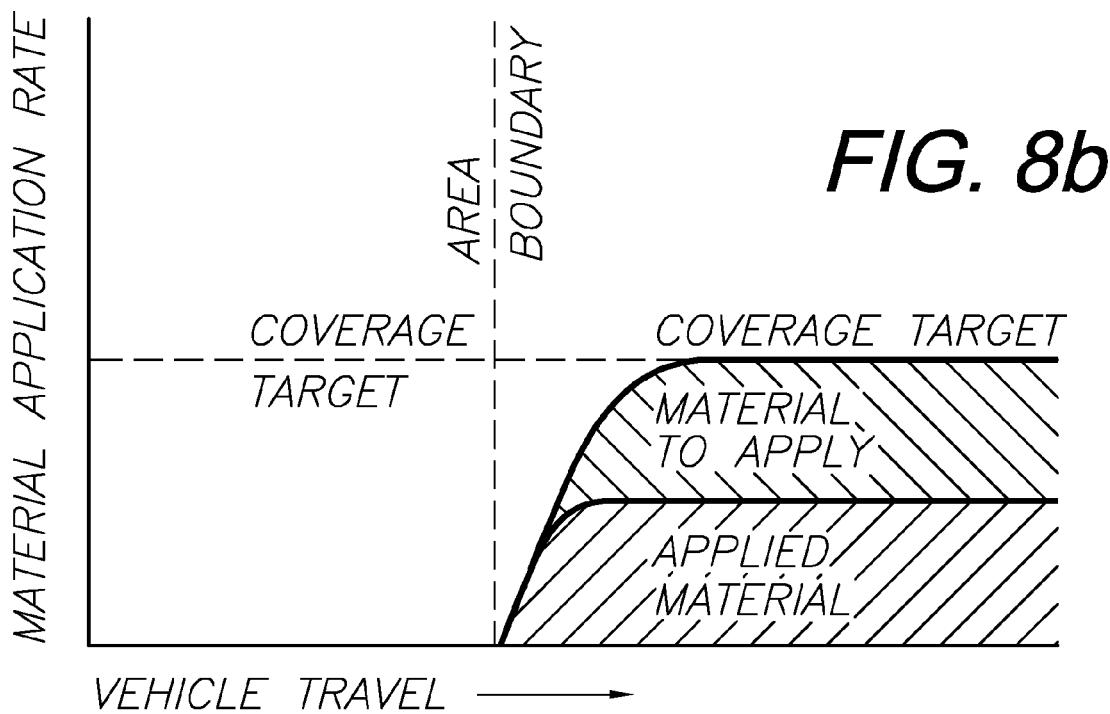
FIG. 8b is another diagram of material application parameters on entering an area to be treated.

FIGS. 8a and 8b show conditions encountered at field perimeters (i.e. area boundaries). FIG. 8a shows a preemptive shut off as the vehicle approaches the area boundary. Programming the system 4 with such "look-ahead" capabilities can prevent chemical application beyond the area boundary. FIG. 8b shows commencing application upon entering a coverage area, which can occur in phases with a first applied material quantity, from which the remaining quantity of material to be applied can be determined in order to achieve the target chemical application.

It is to be understood that the invention can be embodied in various forms, and is not to be limited to the examples discussed above.

What is claimed and desired to be secured by Letters Patent is as follows:

1. A method of guiding an agriculture sprayer vehicle including a motive component and a spray component with a spray boom having opposite ends and multiple spray nozzles mounted in spaced relation between said ends, said components being interconnected by a power hitch adapted for laterally shifting said working component relative to said motive component, which method comprises the steps of:

providing an XY pixel grid corresponding to the area;

providing a raster-based database page comprising said XY pixel grid for said area;

providing a processor on the vehicle;

providing a GNSS guidance system connected to the processor on the vehicle;

receiving GNSS positioning signals with said guidance system;

providing said GNSS positioning signals as input to said processor;

computing GNSS-based positioning for said vehicle with said processor;

defining a GNSS-defined reference point on said area and storing the reference point coordinates with said processor;

computing X and Y pixel indices based on said GNSS-defined vehicle position in relation to said reference point with said processor;

treating portions of said area with said working component;

with said processor marking pixels in said treated area portions as treated;

guiding said vehicle over said area utilizing said treated pixel information;

defining additional raster-based XY pixel grid pages in said area;

expanding said database by tiling said pixel grid pages over said area;

generating X and Y scale factors for said database;

relating said X and Y scale factors to latitude and longitude respectively;

computing X and Y pixel indices based on the difference between current GNSS-defined position coordinates and the reference position coordinates;

creating with said processor a linear or multidimensional database comprising said pixel grid pages;

accessing with said processor said database;

marking pixels in said database as treated;

defining a swath coverage area with said working component ends forming opposite edges of said swath;

with said GNSS system and said processor seeking pixels in proximity to said swath edges;

with said GNSS system and said processor guiding said vehicle along said swath edges;

providing an autosteer system on said vehicle;

with said processor generating steering commands using the marked pixel information and said XY pixel page database;

outputting said steering commands to said autosteer system for automatically steering said vehicle over said area;

with said processor and said GNSS system laterally shifting said working component relative to said motive component for maintaining said working component generally within said swath;

computing an application map for said area corresponding to treatments of pixels therein with said working component;

guiding said vehicle with said application map while treating said pixels; and detecting a vehicle direction of travel with said GNSS system;

walking up the pixels in the vehicle direction of travel to a target pixel;

testing pixels in multiple scans alongside said vehicle path for treated conditions based on a swath width of said working component;

guiding said vehicle towards said target pixel using said treated condition pixel information alongside said vehicle path;

testing multiple distances ahead for treated pixels;

detecting a curve condition defined by treated pixels;

guiding said vehicle alongside said curve using said treated pixel information;

preprogramming said processor with variables corresponding to vehicle performance dynamics;

determining altitudes of said pixels with said GNSS system; and adjusting guidance and steering for vehicle slippage, sloping surface chemical spray patterns and crop heights using said vehicle performance dynamics and said pixel altitudes.

* * * * *